Dec. 18, 1928.  1,696,021

DE QUINCEY VINING

FASTENER FOR SLIDING DOORS

Filed Nov. 8, 1926   2 Sheets-Sheet 1

Inventor
De Quincey Vining
Attorney

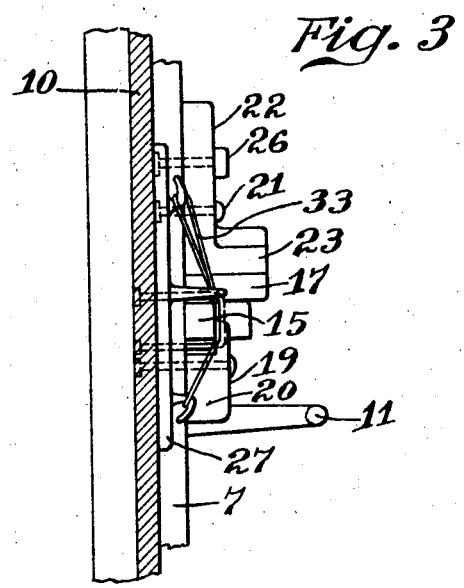
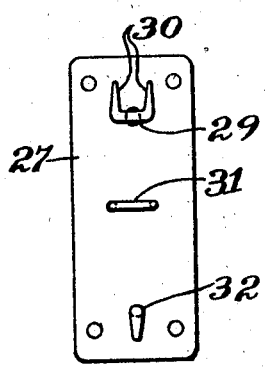
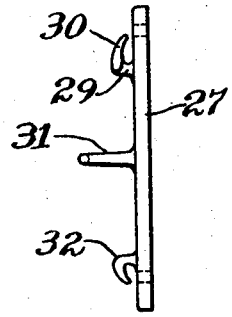

Patented Dec. 18, 1928.

1,696,021

UNITED STATES PATENT OFFICE.

DE QUINCEY VINING, OF MANCHESTER, GEORGIA.

FASTENER FOR SLIDING DOORS.

Application filed November 8, 1926. Serial No. 147,055.

This invention has general reference to devices for securing sliding doors or shutters in closed position, and refers more particularly to such devices which are especially adapted for use in connection with the sliding doors of railroad box cars.

A primary object of the present invention is to produce a fastener for sliding doors and the like which will be locked automatically by the closing of the door, and in which provision is made for sealing the fastener in its locked position so that the door cannot be opened, or the fastener released, without first breaking or otherwise releasing the sealing means.

A further object is to produce such a fastener which is adapted to be sealed in its fastened positon by sealing means such as are commonly used on freight cars, which means consists of a length of flexible metal wire or tape, having associated therewith a slug or button of malleable metal such as lead for sealing the two ends of the wire or tape together to form a closed loop; and to combine with the fastener means which permit of such loop being formed before the sealing means is put in place.

And a still further object is to produce such a fastener in which a member carried by the door is movable in substantially a straight line to locked position, but must be moved, arcuately or otherwise, in a different line in order to release it.

The means by which the foregoing and other objects are accomplished by my invention, and the manner of their accomplishment, readily will be understood from the following description on reference to the accompanying drawings, which depict a preferred embodiment of the invention, and in which:—

Fig. 3 is an end elevation of the door and fastener in closed position and with the sealing means in place, the door stop or jamb being omitted.

Fig. 4 is an enlarged detail view, in plan, of the plate carrying the members by which the sealing means is retained in place when the door is closed.

Fig. 5 is a side elevation of the same.

Figure 1:
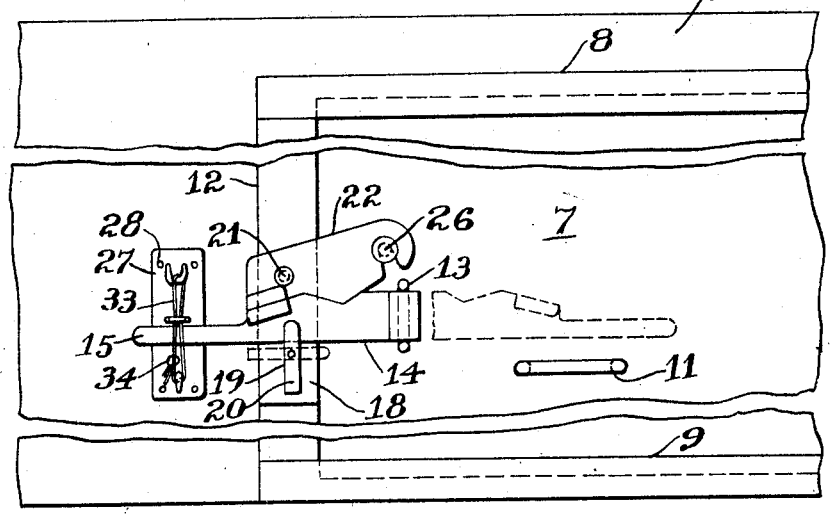
Fig. 1 is a front elevation of a portion of the side of a freight car, and a portion of the door thereof in closed position and having my improved fastener applied thereto.

As shown in the drawings, in which like parts are indicated by corresponding reference characters throughout the several views, the door 7, which may be of any desired form or type of construction, is slidable horizontally between upper and lower guiding members 8 and 9, supported from the side 10 of the car. Since the specific manner in which the door is supported and guided forms no part of the present invention, only the simplest forms of combined guides and supports have been shown in the drawings. The door is provided with a suitable handle 11, and its forward movement is limited by the customary stop or jamb 12. Secured to the door, as by a U-bolt 13, in such a way as to be movable pivotally at right angles to the door, is a hasp 14, having at its free end a reduced portion 15, the lower side of the hasp being flush throughout, and there being formed in its upper side a notch 16, the rear side of which preferably is at an angle of approximately 45° to the longitudinal center line of the hasp, while the forward side of said notch is at a sharply acute angle to said line. Adjoining said notch at its forward side, the upper side of the hasp is inclined downward at an angle substantially equal to that of the forward side of the notch 16, and is provided with a flange 17 which projects outwardly from the hasp at right angles to the face thereof, with its upper surface flush with the inclined upper side of the hasp. In line with the lower side of the hasp a guide block 18 is secured to the door stop 12, and a cleat 19 is pivotally mounted on said block in such position that one of its ends is adapted to project considerably above the upper face of the block and when the cleat is swung in either direction to horizontal position its upper side is flush with that of the block, the end 20 of the cleat being counterweighted, so that the cleat tends to remain in a substantially vertical position.

Pivotally secured to the door stop 12, as by a bolt 21, above the guide block 18 and spaced therefrom, is a dog 22 having a flange 23 projecting at right angles from the lower edge of its outer face, and having an angular projection 24 on its lower side adjacent said flange, the shape and dimensions of said flange and said projection being such as to adapt said projection to fit snugly in the notch 16 of hasp 14 with the lower side of the flange 23 engaged with the upper side of the flange 17. Near its free end said dog has formed in its lower side a slot 25, in position to embrace the shank of a stop pin or bolt 26 projecting from the door 7 above the hasp 14.

A plate 27 is secured to the side 10 of the car, as by bolts 28, and has projecting from the outer face thereof, one above another in a line substantially parallel with the forward edge of the door, an upper bolt 29, having two similar hooked prongs 30; below bolt 29 a U-bolt 31, the lower face of which is somewhat above the plane of the upper side of the reduced portion 15 of the hasp 14; and below said U-bolt a downwardly-turned hook 32, which is somewhat below the plane of the lower edge of said reduced portion of the hasp. The sealing member 33 preferably is of the sort commonly used on freight cars, and comprises a length of flexible, strand wire, or metal tape, the ends of which are passed through openings provided therefor in a slug or button 34 of lead or other malleable metal, and are secured together by compressing said slug or button with a suitable sealing tool. Ordinarily lengths of twisted wire are used, each of which has a lead button initially secured near one end thereof, and said button has a hole therethrough for the loose reception of the other end of the wire.

Figure 2:
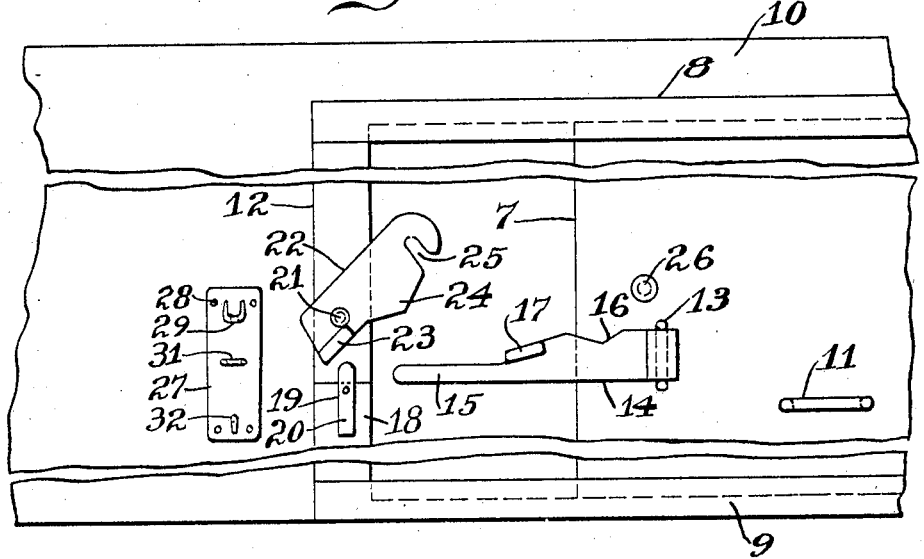
Fig. 2 is a view similar to Fig. 1, but showing the positions of the parts of the fastener before the door is closed.

Heretofore, in sealing freight car doors the practice usually has been to pass the buttonless end of the wire through the staple or other member that co-operates with the hasp, then through the hole in the button, and to compress the button with a hand tool and thereby seal the two ends of the wire together, while at the same time impressing letters or other characters in one or both faces of the button if desired. In the use of my improved fastener, however, the wire or other sealing member may initially be formed into a closed loop in any preferred manner, either by the use of a lead seal or otherwise, and may be put in place before the door is closed or the fastener in place. Assuming the door to be partly or entirely open, and the parts of the fastener to be in the positions shown in Fig. 2, the sealing member, in the form of a closed loop, may first be placed in sealing position, by passing the bight of the loop over one of the prongs 30 of the bolt 29 on plate 27, then threading the ends of the sealing member downward through the opening between the bend of the U-bolt 31 and the plate 27, and placing the lower portion of the loop over the hook 32. The size of the loop must be such that when so placed it will be sufficiently slack to permit the reduced portion 15 of the hasp 14 to be inserted between the sealing member and the plate 27, and that sufficient slack will thus be taken up to prevent removal of the loop from either bolt 29 or hook 32. Upon advancing the door to closed position, engagement of the upper surface of the flange 17 of the hasp with the lower surface of the flange 23 on the dog 22 will move said dog pivotally on the bolt 21 until, when the door is fully closed, the projection 24 on the lower side of the dog will be fully entered in the notch 16 of the hasp, the opposed faces of the flanges 17 and 23 will be tightly engaged, and the shank of the bolt 26 will be embraced by the slot 25 at the free end of the dog. As the door is thus advanced to closed position, the slack of the sealing member 33 is pulled outward manually so that the reduced portion 15 of the hasp may pass between said member and the plate 27. With the parts of the fastener in the positions assumed by them when the door is fully closed, as shown in Fig. 1, the door cannot be opened, since any tendency of rearward movement of the forward side of the notch 16 of the hasp to move the free end of the dog pivotally upward by engagement with the projection 24, will be opposed due to the engagement of the flange 23 on the dog with the flange 17 of the hasp, and the enlarged head of the bolt 26 will prevent disengagement of the dog from said bolt by forcing the free end of the dog away from the door. Therefore, in order that the door may be opened the sealing member must first be removed, which may be done by cutting or detaching the button 34 or otherwise separating the ends of the loop. Following such removal of the sealing member, the cleat 19 is moved manually to horizontal position, leaving the hasp free to be swung pivotally outward away from the door until the flange 17 and the notch 16 of the hasp are freed from the flange 23 and the projection 24 of the dog, the dog is swung pivotally upward out of engagement with the bolt 26, and the door is free to be opened. When not in use, the hasp 14 may be swung back against the door to the position shown in dotted lines in Fig. 1.

Manifestly, the use of my improved fastener is in no wise dependent upon the form of sealing member employed, or the manner in which it is put in place, but the fastener is especially adapted for use with what may be regarded as the standard form of sealing member now in use on freight cars, and entirely does away with the necessity for closing the ends of the sealing wire by compressing the lead button with a hand-operated tool after the door has been closed.

Various modifications of minor details of my improved fastener doubtless readily will suggest themselves to those skilled in this art, but such modifications fall within the scope of my inventive rights, and the invention is not to be construed as being limited to any details not specifically set out in the claims.

Having thus fully disclosed the invention, what I claim as new, and seek to secure by Letters Patent, is:—

1. The combination, with a sliding door and a surface relative to which it is slidable, of a hasp carried by said door, means for automatically securing said hasp to said surface by advancement of said door toward said securing means, and a seal adapted to be placed in position before the hasp is secured and automatically rendered effective by such advancement of the door to prevent release of the hasp until the seal is broken.

2. The combination recited in claim 1, in which the securing means is effective upon one part of the hasp, and the seal is effective upon another exposed portion thereof.

3. The combination, with a sliding door and a surface relative to which it is slidable, of self-fastening means for securing said door in closed position, and a seal for said securing means, comprising an initially-closed loop, adapted to be applied to part of said securing means before same is fastened and to engage other parts of the securing means after same is fastened, whereby said seal must be opened to permit unfastening said door.

4. In a fastener for a sliding door having a frame relative to which it is slidable, a hasp pivoted to swing in a plane normal to the door, a rigid dog for cooperating with the hasp to fasten it and pivoted at an intermediate point to swing in a plane parallel with the door, cooperating members provided on the hasp and the dog respectively and engageable on both sides of the dog's pivot to fasten the door upon closing movement of the door with the hasp directed toward the dog, said cooperating members being so disposed as to permit their disengagement only upon a swinging movement of the hasp normal to the plane of the door.

5. A fastener as set forth in claim 4 wherein the hasp is pivoted on the door and the dog on the door frame and wherein a pin projects from the door, and the end of the hasp is provided with a hook portion to engage the pin.

6. A fastener as set forth in claim 4 wherein the hasp is pivoted on the door and the dog on the door frame, and wherein a guide block having a pivoted cleat thereon is secured to the door frame to cooperate with the hasp and hold it against unintended swinging in a plane normal to the door.

7. A fastener as set forth in claim 4 wherein the hasp is pivoted on the door and the dog on the door frame, wherein a guide block having a pivoted cleat thereon is secured to the door frame to cooperate with the hasp and hold it against unintended swinging in a plane normal to the door, and wherein projections are provided on the door frame and so disposed as to overhang the hasp on both sides thereof when the door is fastened, said projections being adapted to retain a seal extending across the hasp.

In testimony whereof I affix my signature.

DE QUINCEY VINING.